United States Patent
Wu

(10) Patent No.: US 7,341,882 B2
(45) Date of Patent: Mar. 11, 2008

(54) METHOD FOR FORMING AN OPTO-ELECTRONIC DEVICE

(75) Inventor: Bor-Jen Wu, Taipei (TW)

(73) Assignee: Uni Light Technology Inc., Tao-Yuan (TW)

( * ) Notice: Subject to any disclaimer, the term of this patent is extended or adjusted under 35 U.S.C. 154(b) by 203 days.

(21) Appl. No.: 10/714,858

(22) Filed: Nov. 18, 2003

(65) Prior Publication Data

US 2005/0105878 A1    May 19, 2005

(51) Int. Cl.
*H01L 21/00* (2006.01)

(52) U.S. Cl. ............. 438/29; 257/E21.7; 257/E21.505; 438/32

(58) Field of Classification Search ................ 438/637, 438/29, 32, 26, 64, 57, 98; 257/99, E21.7, 257/E21.505, E21.506
See application file for complete search history.

(56) References Cited

U.S. PATENT DOCUMENTS 6,756,289 B1 * 6/2004 Nakagawa et al. ......... 438/478

6,825,502 B2 * 11/2004 Okazaki et al. ............... 257/98

FOREIGN PATENT DOCUMENTS

WO    W092/02037    * 6/1992

OTHER PUBLICATIONS

L. C. Wang, et al. "Low Temperature-Processed (150-175° C.) Ge/Pd-Based Ohmic Contacts ($\rho_C$~1×10$^{-6}$ Ω cm$^2$) to η-GaAs"- Appl. Phys. Lett., pp. 67-Jul. 24, 1995.

* cited by examiner

*Primary Examiner*—Caridad Everhart
(74) *Attorney, Agent, or Firm*—Birch, Stewart, Kolasch & Birch, LLP

(57) ABSTRACT

A method for forming an opto-electronic device through low temperature processes is provided. An active layer is bonded to a substrate by a common adhesive to maintain or increase the luminous efficiency of the opto-electronic because the electric conductive elements of the opto-electronic are formed on the active layer by a solid phase regrowth process through a low temperature processe.

28 Claims, 3 Drawing Sheets

METHOD FOR FORMING AN OPTO-ELECTRONIC DEVICE

BACKGROUND OF THE INVENTION

1. Field of the Invention

This present invention relates to a method for forming an opto-electronic device, and more particularly to a method for forming an opto-electronic device through a solid state growth process at low temperature.

2. Description of the Prior Art

In recent years, the opto-electronic devices, e.g. Light-Emitting Diodes (LED), solar cells and light sensors, have become more and more popular. During forming an LED, the electrodes of the LED are formed on a substrate consisted of compound semiconductor, e.g. GaAs, GaN or InP. For forming well ohmic contact between the electrodes and the substrate, the LED has to be treated at the temperature being higher than 400 degrees centigrade, i.e. 400° C. If an improper material with a melting point being lower than 400 degrees centigrade is used to be on of the elements of the LED device, the improper material may be melted or be transformed lattices of itself in a high temperature process being higher than 400° C., e.g. Rapid Thermal Annealing Process, RTP. The material of the compound semiconductor and the active layer may be destroyed to reduce the quality and the illuminant efficiency of the opto-electronic device, i.e. the LED. The yield for producing the opto-electronic devices is also reduced because the structure of the elements is destroyed.

Futhermore, the illuminant efficiency of an LED device with an opaque substrate has to be increased. An opto-electronic device, e.g. an LED device, with a transparent substrate is constructed to improve the disadvantage of an opto-electronic device with an opaque substrate that absorbs light and decreases the illuminating efficiency of the opto-electronic device. However, for forming ohmic contact between electrodes and the substrate, almost all elements of the opto-electronic device have to suffer the temperature being higher than 400 degrees centigrade. The heat produced in the process at the temperature being higher than 400 degrees centigrade limits the material of elements. The materials of elements of the opto-electronic device must be selected from the materials with the melting point or the glass transition temperature that is higher than 400 degrees centigrade.

Hence, it is an important objective for developing a method for forming an opto-electronic device, e.g. an LED device, to reduce the disadvantage of the prior art, increase the selectivity of the materials of the elements and increase the yield for producing the opto-electronic device.

SUMMARY OF THE INVENTION

In accordance with the present invention, a method for forming an opto-electronic device at low temperature is provided. According to the above-mentioned method, an objective of the present invention is to provide an opto-electronic device formed through a solid state growth process at the low temperature to increase the selectivity of the materials of the elements and the yield for producing opto-electronic devices.

It is another object of the present invention to provide a method for forming an opto-electronic device through a solid state growth process at the low temperature to form a transparent substrate within the opto-electronic device to increase the illuminant efficiency.

It is further another object of the present invention to provide a method for forming an opto-electronic device through a solid state growth process at the low temperature to prevent the elements, e.g. an active layer or an adhesive layer, of the opto-electronic device from destroyed by the high temperature. The method of the present invention increases the operating efficiency of the opto-electronic device.

In accordance with the above-mentioned objects, the invention provides a method for forming an opto-electronic device through a low temperature process. An opto-electronic layer formed on a substrate of the opto-electronic device. An electric conductive element is formed on the opto-electronic layer through a solid state growth process at the low temperature.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Then, the components of the devices in this application are not shown to scale. Some dimensions are exaggerated to the related components to provide a more clear description and comprehension of the present invention.

The present invention provides a method for forming an opto-electronic device at the low temperature. The electric conductive elements of the opto-electronic device are formed through a solid state growth process at the low temperature. The opto-electronic device is formed at the low temperature, so that the material of the elements of opto-electronic device of the present invention can be selected from the material with lower melting point or lower glass transition temperature. It is much easier to select the material of the element of the present opto-electronic device. For example, the material of an opaque substrate or a transparent substrate can be selected from both the material with higher melting point or the material with lower melting point. The material of the electric conductive elements can be selected from both the material with higher melting point or the material with lower melting point. Furthermore, the structure of every element of the opto-electronic device of the present invention is more stable because the processes processing at the lower temperature cannot destroy the structure of every element. Thus the opto-electronic devices of the present invention includes higher operating quality, higher operating efficiency and more practical applications for different kinds of devices.

Figure 1A:
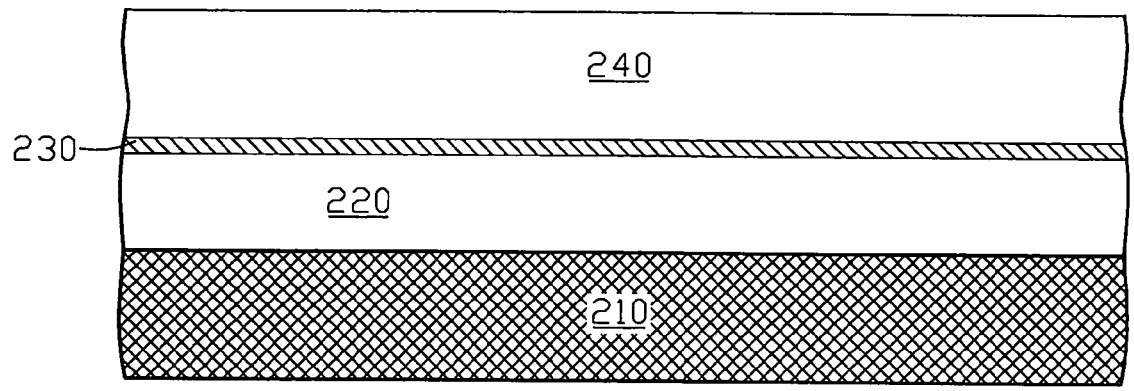
FIG. 1A to FIG. 1E are profile diagrams for forming an LED device according to this present invention.
Figure 1B:
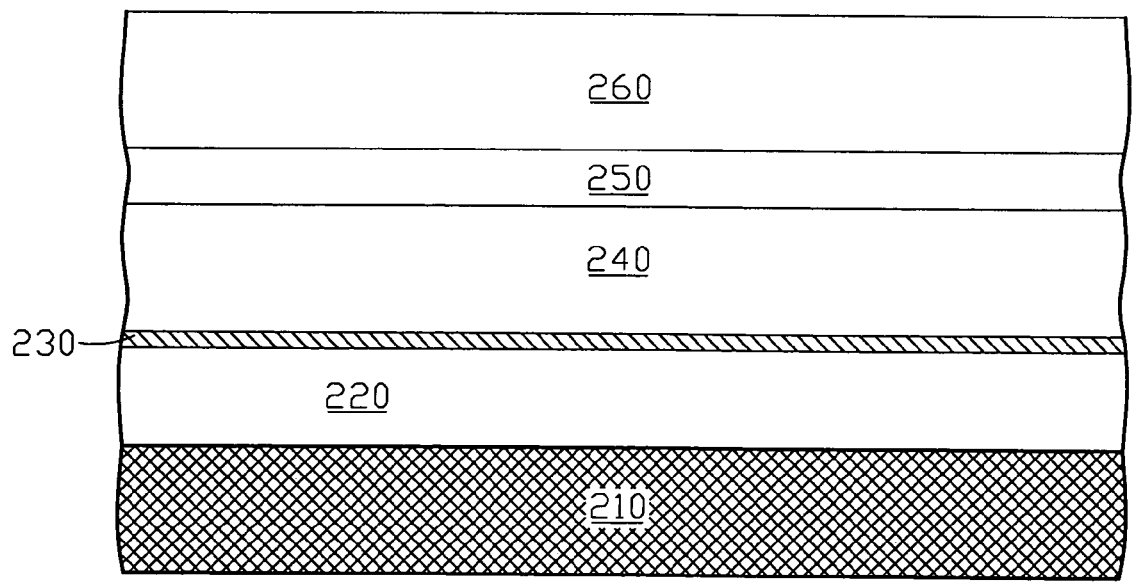

The profile diagrams of the embodiment of the present invention are shown in FIG. 1A-1E. The substrate of the opto-electronic device of the present invention may be an opaque substrate, e.g. a substrate with GaAs, or a transparent substrate, even if the substrate of the embodiment of the present invention is a transparent substrate. As shown in FIG. 1A, an opto-electronic layer is formed, e.g. deposited, on a substrate 210. The opto-electronic layer includes a first semiconductor layer 220, an active layer 230 and a second semiconductor layer 240. As shown in FIG. 1B, an adhesive layer 250 is formed on the second semiconductor layer 240 and a substrate 260, i.e. a transparent substrate, is formed on the adhesive layer 250 subsequently. The adhesive layer 250 adheres the substrate 260 on the second semiconductor layer 240.

As shown in FIG. C, the substrate 210 is removed and then the opto-electronic device is turned over. The substrate 210 is removed by a lapping process, an etching process, or both of the lapping process and the etching process. There may be an etching stop layer formed between the opto-electronic layer and the substrate 210 for stopping etching.

Figure 1C:
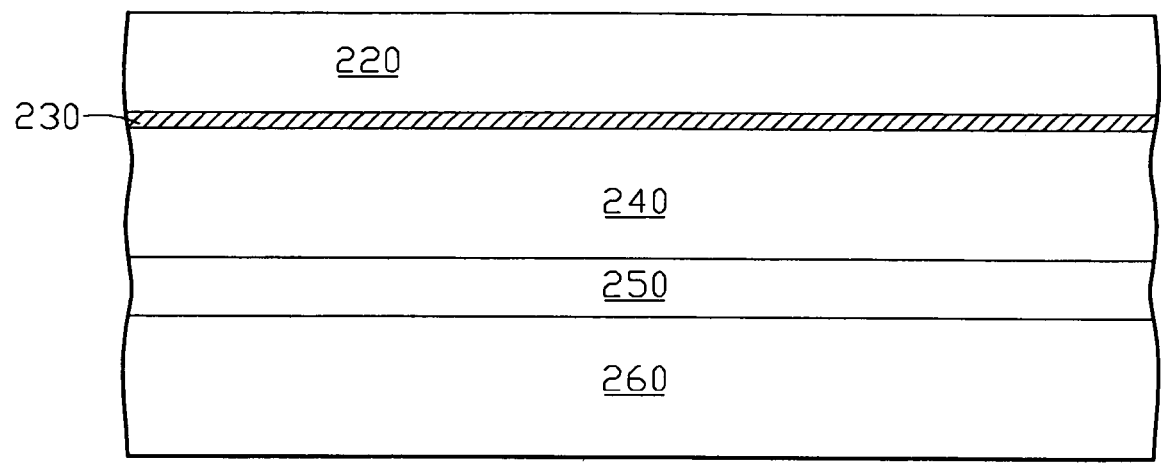
Figure 1D:
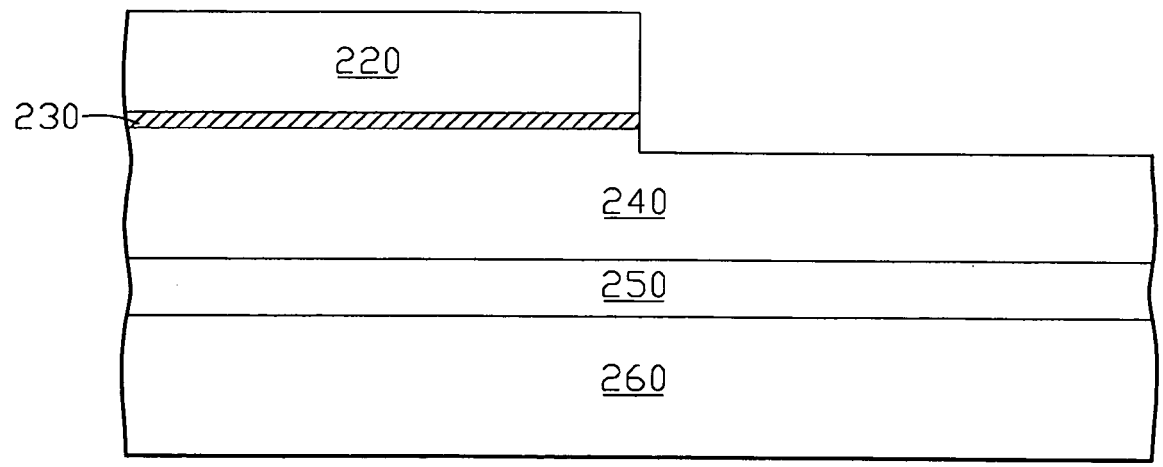

A structure for emitting light being not shown in FIG. 1C is defined within the opto-electronic layer according to a pattern of a photoresist layer formed on the opto-electronic layer, wherein the photoresist layer is not shown in FIG. 1C either. To form the structure for emitting light, portions of the first semiconductor layer 220, portions of the active layer 230 and portions of the second layer 240 are etched in an etching process, e.g. a dry etching process or a wet etching process, as shown in FIG. 1D.

Figure 1E:
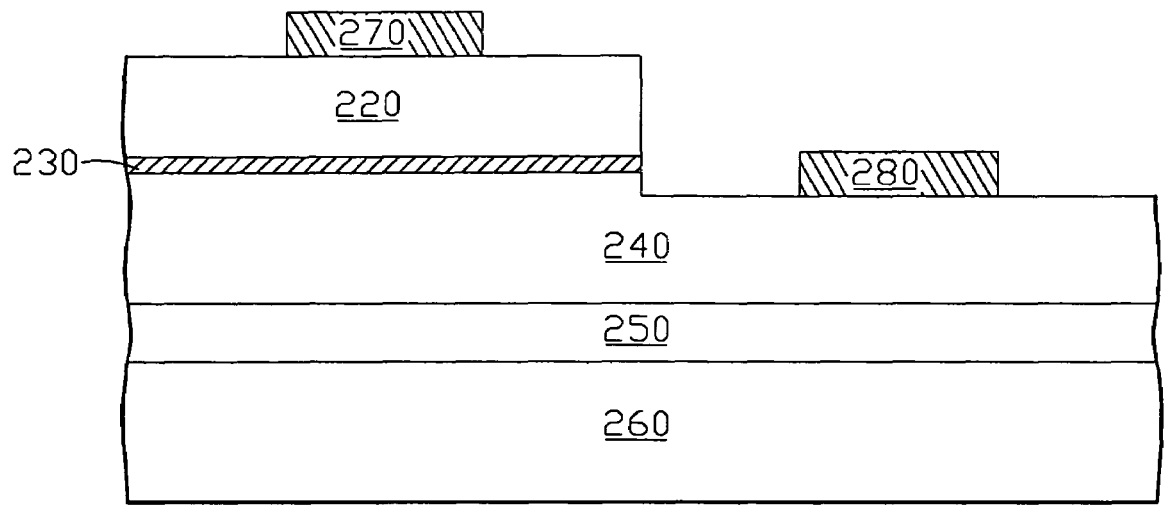

As shown in FIG. 1E, electric conductive elements, e.g. an electrode 270 and an electrode 280, are formed on the first semiconductor layer 220 and the second semiconductor layer 240 respectively by an electron beam evaporation process, a sputtering deposition method, thermal evaporation process or another kind of deposition method. Subsequently, the opto-electronic layer and the electrode 270 and 280 are treated through a solid state growth process, i.e. SPR process, to form ohmic contact between the electrode 270 and the first semiconductor layer 220, and between the electrode 280 and the second semiconductor layer 240.

The order for forming the electrodes 270 and 280 and ohmic contact between the electrodes and the substrate layers 220 and 240 changes for necessity. For example, as shown in FIG. 1C to FIG. 1E, the electrode 270 and the electrode 280 are formed on the first semiconductor layer 220 and the second semiconductor layer 240 before forming ohmic contact through the SPR process. The other order is not shown in FIG. 1A-1E, the electrode 270 can be formed on first semiconductor layer 220 of the structure as shown in FIG. 1C. After the first semiconductor layer 220, the active layer 230 and the second semiconductor layer 240 are etched to be the structure as shown in FIG. 1D, the electrode 280 is formed on the second semiconductor layer 240 as shown in FIG. 1E. The opto-electronic device of the present invention is treated through the SPR process to form ohmic contact between the electrode 270 and the first semiconductor layer 220, and between the electrode 280 and the second semiconductor layer 240. Furthermore, according to the second order for forming the electrodes 270 and 280 and ohmic contact, the opto-electronic device may be treated through the SPR process twice to for ohmic contact. The opto-electronic device may be treated through the first SPR process after the electrode 270 being formed on the first semiconductor layer 270 and before the electrode 280 being formed on the second semiconductor layer 280. The opto-electronic device is treated through the second SPR process to form ohmic contact after the electrode 280 being formed on the second semiconductor layer 280. Of course, the order for forming the electrodes and ohmic contact of the present invention is not limited on the above description.

The temperature for treated the electrode 270 and the electrode 280 is controlled to be lower than 250 degrees centigrade. The temperature for treated the electrode 270 and the electrode 280 may also be controlled to be lower than 200 degrees centigrade or 175 degrees centigrade. The temperature may also be controlled higher than 100 degrees centigrade, 150 degrees centigrade or 175 degrees centigrade. Because the temperature for treated the electrodes 270 and 280 of the opto-electronic device of the present invention is much lower than that of the prior art, the active layer 230 and other elements of the opto-electronic layer of the present invention is not affected by high temperature. So that the operating quality of the active layer 230 and the whole opto-electronic device of the present invention is better than that of the prior art.

The structure of the opto-electronic device of the embodiment of the present invention is a structure of light emitted device, LED. The structure of the active layer 230 may be a quantum well. The first semiconductor layer 220 is a n-type doped semiconductor layer, and the second semiconductor layer 240 is a p-type doped semiconductor layer of this embodiment. Of course, the first semiconductor layer 220 may be a n-type doped semiconductor layer, and the second semiconductor layer 240 is a n-type doped semiconductor layer of the present invention. Furthermore, the structure of the opto-electronic layer of the present invention is not limited on the structure of the above embodiment.

The electric conductive elements, i.e. the electrode 270 and the electrode 280, are formed by many kinds of the material. The material may be Ni, Pd, Ge, Si, Se, Zn, Be, Mg, Cd, Au, Ag, Pt and the components consisted of Au, Ag and Pt, e.g. AuAg, AgPt, AuPt and AuAgPt, wherein the order for consisting the Au, Ag and Pt can be exchanged. To explain more clearly, the letter 'A' means the material Ni and Pd. The letter 'B' means the material Ge, Si and Se. The letter 'C' means the material Zn, Be, Mg and Cd. The letter 'D' means the material Au, Ag, Pt and the material consisted of Au, Ag, Pt. The materials of the electrodes 270 and 280 are ABD and ACD, wherein the order of ABD can be exchanged, and ACD does, too. The electrode 220 consisted of ABD is selected to be formed on the first semiconductor layer 270 being a n-type doped semiconductor layer. The electrode 240 consisted of ACD is selected to be formed on the second semiconductor layer 280 being a p-type doped semiconductor layer. Of course, the material of the electrodes of the present invention is not limited on the above material.

The material of the substrate 260, i.e. the transparent substrate, may be glass, silicon, epoxy resin, poly methyl methacrylate, acrylonitrile butadiene styrene copolymer resin, and polymethyl methacrylate, sapphire. The material of the substrate 260 may also be polysulfones, polyethersulfones, polyetherimides, polyimides, polyamide-imide, polyphenylene sulfide and silicon-carbon thermosets. The material of the substrate 260 of this embodiment of the present invention is glass.

The adhesive layer 250 is transparent. The material of the adhesive layer 250 may be epoxy resin, acrylonitrile butadiene styrene copolymer resin and polymethyl methacrylate.

The material of the adhesive layer 250 may also be polysulfones, polyethersulfones, polyetherimides, polyimides, polyamide-imide, polyphenylene sulfide and silicon-carbon thermosets. The material of the adhesive layer 250 of this embodiment of the present invention is epoxy resin.

If the adhesive layer 250 of the present invention is a transparent solid at the room temperature, the adhesive layer 250 can replace the transparent substrate 260 formed on the second semiconductor layer 240. So that the step for adhering or forming the substrate 260 on the second semiconductor layer 240 is reduced. The cost of the substrate 260 is reduced, too. The substrate 260 can be the material with lower melting point. The adhesive layer 250 can be also the material with lower melting point. It is more conveniently to choose the material of the substrate 260 and the adhesive layer 250 of the present invention and more conveniently to form the substrate 260 on the opto-electronic layer.

The opto-electronic device in the present invention may be elements of solar cells, a light sensor or other opto-electronic technology devices including electric conductive elements, even though the opto-electronic devices of the described preferred embodiment is a LED device with a transparent substrate.

The present invention forms an opto-electronic layer on a substrate at the lower temperature. The electric conductive elements of the opto-electronic device are formed through a solid state growth process at the low temperature. The opto-electronic device is formed at the low temperature, so that the material of the elements, e.g. an epoxy substrate, with lower melting point or lower glass transition temperature of opto-electronic device of the present invention can be selected. It is much more conveniently and much easier to select the material of elements of the present opto-electronic device. The material of the electric conductive elements can be selected from both the material with higher melting point or the material with lower melting point. The step for forming the substrate on the opto-electronic layer is also more conveniently. The structure of every element of the opto-electronic device of the present invention is more stable because the processes processing at the lower temperature cannot destroy the structure of every element. Thus the opto-electronic devices of the present invention includes higher operating quality, higher operating efficiency and more practical applications for different kinds of devices. Furthermore, if the substrate of the opto-electronic device is transparent, the present invention also provides an opto-electronic device with higher illuminant efficiency and higher operating efficiency. The present invention further increases the yield for producing opto-electronic devices. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for forming an opto-electronic device, comprising:
    providing a substrate and an opto-electronic layer thereon, wherein said substrate is a transparent substrate, and said transparent substrate is a member selected from the group consisting of glass, silicon, epoxy resin, poly methyl methacrylate, acrylonitrile butadiene styrene copolymer resin, polymethyl methacrylate, sapphire, polysulfones, polyethersulfones, polyetherimides, polyimides, polyamide-imide, polyphenylene sulfide and silicon-carbon thermosets;
    forming an electric conductive element on said opto-electronic layer; and
    forming an ohmic contact between said electric conductive element and said opto-electronic layer at a temperature lower than 250 degrees centigrade.

2. The method according to claim 1. wherein said ohmic contact is formed at the temperature being lower than 200 degrees centigrade.

3. The method according to claim 1, wherein said ohmic contact is formed at the temperature being higher than 100 degrees centigrade and lower than 175 degrees centigrade.

4. The method according to claim 1, wherein said ohmic contact between said electric conductive element and said opto-electronic layer is formed through a solid state growth process.

5. The method according to claim 1, wherein said electric conductive element is a material selected (tom the group consisting of Ni, Pd, Ge, Si, Se, Au, Ag, Pt, AuAg, AgPt, AuPt and AuAgPt.

6. The method according to claim 1, wherein said electric conductive element is a material selected from the group consisting of Ni, Pd, Zn, Be, Mg, Cd, Au, Ag, Pt, AuAg, AgPt, AuPt and AuAgPt.

7. The method according to claim 1, wherein said electric conductive element is a material selected from the group consisting of Ni, Pd, Ge, Si, Se, Au, Ag, Pt, AiAg, AgPt, AuPt and AuAgPt.

8. The method according to claim 1, wherein said electric conductive element is a material selected from the group consisting of Ni, Pd, Zn, Be, Mg, Cd, Au, Ag, Pt, AuAg, AgPt, AuPt and AuAgPt.

9. A solar cell comprising an opto-electronic device formed by a method for forming an opto-electronic device according to claim 1.

10. A light sensor comprising an opto-electronic device formed by a method for forming an opto-electronic device according to claim 1.

11. The method according to claim 1. wherein said step for providing said oplo-electronic layer on said opto-electronic layer comprises forming a plurality of semiconductor layers on said opto-electronic layer.

12. The method according to claim 11 further comprising forming said electric conductive element on a n-type doped semiconductor layer of said opto-electronic layer, wherein said electric conductive element is selected from the group consisting of Ni, Pd, Ge, Si, Se, Au, Ag, Pt, AiAg, AgPt, AuPt and AuAgPt.

13. The method according to claim 11, further comprising forming said electric conductive element on a p-type doped semiconductor layer of said opto-electronic layer, wherein said electric conductive element is selected from the group consisting of Ni, Pd, Zn, Be, Mg, Cd, Au, Ag, Pt, AuAg, AgPt, AuPt and AuAgPt.

14. The method according to claim 1, wherein said electric conductive element comprises a plurality of electrodes.

15. The method according to claim 13, wherein said step for providing said substrate and said opto-electronic layer thereon comprises:
    forming a first semiconductor layer on said substrate;
    forming an active layer onto said first semiconductor layer; and
    forming a second semiconductor layer onto said active layer.

16. The method according to claim 15, wherein said step for forming said electric conductive element comprises:

removing portions of said first semiconductor layer and said active layer to expose portions of said second semiconductor layer; and forming said electric conductive element on said first semiconductor layer and said exposed second semiconductor layer.

17. The method according to claim 16, wherein said first semiconductor is a n-type doped semiconductor layer.

18. The method according to claim 16, wherein said first semiconductor is a p-type doped semiconductor layer.

19. The method according to claim 18, wherein said second semiconductor layer is a n-type doped semiconductor layer.

20. The method according to claim 17, wherein said second semiconductor layer is a p-type doped semiconductor layer.

21. The method according to claim 1, wherein said step for providing said substrate comprises adhering said opto-electronic layer on said transparent substrate by an adhesive layer.

22. The method according to claim 21, wherein said adhesive layer is a member selected from the group consisting of epoxy resin, acrylonitrile butadiene styrene copolymer resin and polymethyl methacrylate.

23. The method according to claim 21, wherein said adhesive layer is a material selected from the group consisting of polysulfones, polyethersulfones, polyotherimides, polyimides, polyamide-imide, polyphenylene sulfide and silicon-carbon thermosets.

24. A method for forming an opto-electronic device, comprising:

providing a substrate, wherein said substrate is a transparent substrate, and said transparent substrate is a member selected from the group consisting of glass, silicon, epoxy resin, poly methyl methacrylate, acrylonitrile butadiene styrene copolymer resin, polymethyl methacrylate, sapphire, polysulfones, polyethersulfones, polyetherimides, polyimides, polyamide-imide, polyphenylene sulfide and silicon-carbon thermosets;

forming an opto-electronic layer on said substrate;

forming a transparent substrate an said opto-electronic layer and removing said substrate;

forming an electric conductive element on said opto-electronic layer; and forming an ohmic contact between said electric conductive element and said opto-electronic layer at a temperature lower than 250 degrees centigrade.

25. The method according to claim 24, wherein said ohmic contact between said electric conductive element and said opto-electronic layer is formed by a solid state growth process.

26. The method according to claim 24, wherein said ohmic contact is formed at a temperature being lower than 200 degrees centigrade.

27. The method according to claim 24, wherein said ohmic contact is formed at a temperature being higher than 100 degrees centigrade and lower than 175 degrees centigrade.

28. The method according to claim 24, wherein said electric conductive element is a material selected from the group consisting of Ni, Pd, Ge, Si, Sc, Zn, Be, Mg, Cd, Au, Ag, Pt, AuAg, AgPt, AuPt and AuAgPt.

* * * * *